(12) United States Patent
Smith et al.

(10) Patent No.: US 7,286,166 B2
(45) Date of Patent: Oct. 23, 2007

(54) CALIBRATING DIGITAL CAMERAS FOR VARYING AMBIENT LIGHT CONDITIONS

(75) Inventors: Ronald D. Smith, Phoenix, AZ (US); Werner Metz, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 506 days.

(21) Appl. No.: 10/784,078

(22) Filed: Feb. 20, 2004

(65) Prior Publication Data

US 2004/0165065 A1    Aug. 26, 2004

Related U.S. Application Data

(63) Continuation of application No. 09/320,790, filed on May 27, 1999, now abandoned.

(51) Int. Cl.
*H04N 5/235* (2006.01)

(52) U.S. Cl. .................... 348/229.1; 348/362

(58) Field of Classification Search ............ None
See application file for complete search history.

(56) References Cited

U.S. PATENT DOCUMENTS

| | | | | |
|---|---|---|---|---|
| 4,954,861 A * | 9/1990 | Nagaoka et al. | ........... 396/109 |
| 5,119,178 A * | 6/1992 | Sakata et al. | ........... 348/223.1 |
| 5,142,359 A * | 8/1992 | Yamamori | ........... 348/70 |
| 5,701,015 A * | 12/1997 | Lungershausen et al. | 250/495.1 |
| 5,733,246 A * | 3/1998 | Forkey | ........... 600/160 |
| 5,831,686 A * | 11/1998 | Beretta | ........... 348/602 |
| 5,852,675 A * | 12/1998 | Matsuo et al. | ........... 382/167 |
| 5,930,383 A * | 7/1999 | Netzer | ........... 382/154 |
| 5,982,424 A * | 11/1999 | Simerly et al. | ........... 348/229.1 |
| 6,205,244 B1 * | 3/2001 | Bawolek et al. | ........... 382/162 |
| 6,275,256 B1 * | 8/2001 | Olczak et al. | ........... 348/131 |
| 6,404,984 B1 * | 6/2002 | Parvulescu et al. | ........... 396/16 |
| 6,542,185 B1 * | 4/2003 | Bogardus | ........... 348/223.1 |
| 6,734,450 B2 * | 5/2004 | Kakiuchi et al. | ........... 250/559.38 |
| 2003/0035048 A1 * | 2/2003 | Shipp | ........... 348/68 |

* cited by examiner

*Primary Examiner*—Lin Ye
*Assistant Examiner*—Yogesh Aggarwal
(74) *Attorney, Agent, or Firm*—Trop, Pruner & Hu, P.C.

(57) ABSTRACT

An internal or external device may be utilized to calibrate a digital camera for changing ambient light conditions. The device may include a surface which either provides for white light reflectivity or white light transmissivity for making a first measurement of white light intensity. A plurality of light emitting elements of known wavelengths can be used to obtain a second intensity measurement. This information may be used to calibrate the camera for changing ambient light.

27 Claims, 5 Drawing Sheets

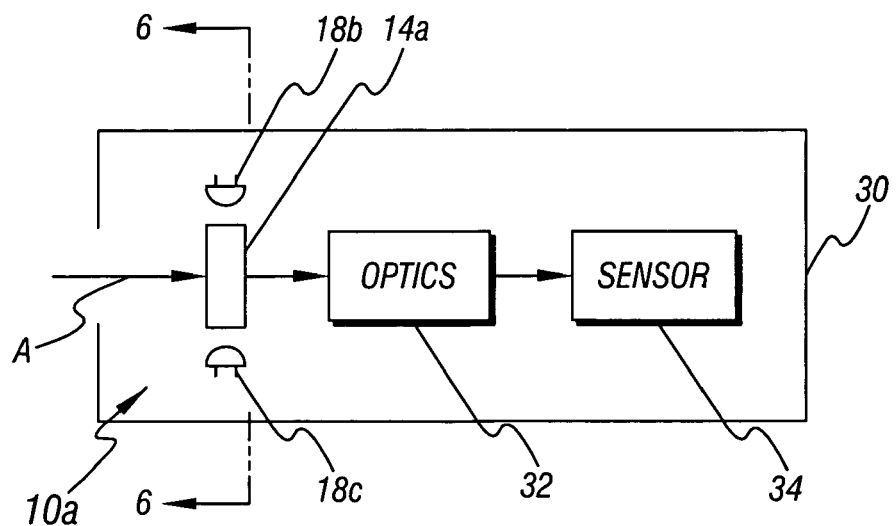
*FIG. 3*
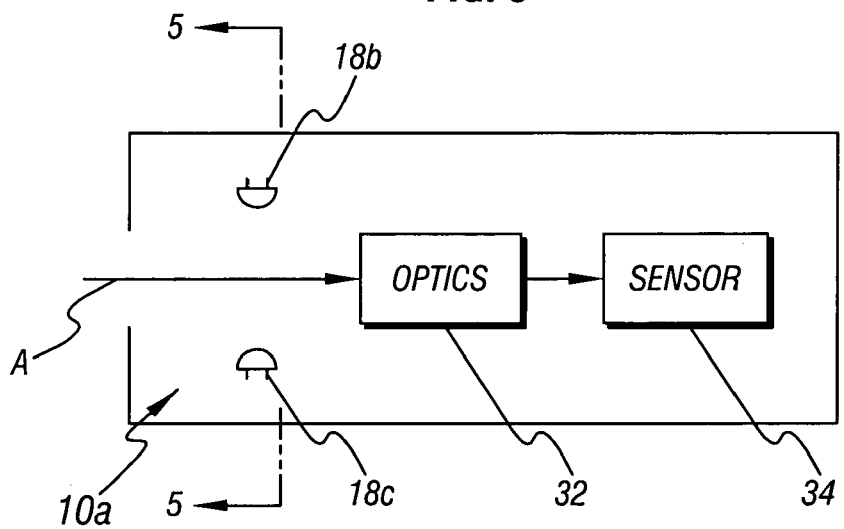
*FIG. 4*
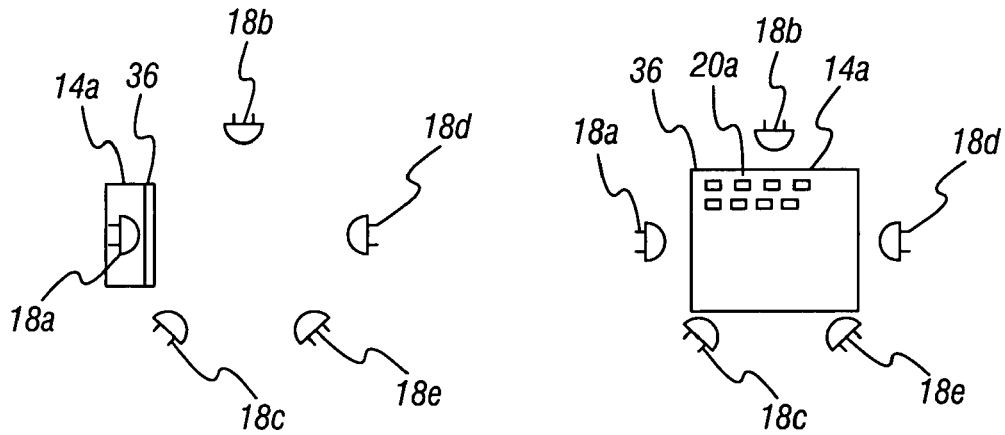
*FIG. 5*          *FIG. 6*

CALIBRATING DIGITAL CAMERAS FOR VARYING AMBIENT LIGHT CONDITIONS

This is a continuation of prior application Ser. No. 09/320,790, filed May 27, 1999 now abandoned.

BACKGROUND

This invention relates generally to digital cameras and particularly to the calibration of such cameras to account for different ambient light conditions.

The human eye has an amazing ability to accommodate for different light conditions. The eye is capable of correctly detecting color in a variety of different ambient conditions.

Analog and digital cameras generally record colors differently under different light conditions. The same color may look different in pictures taken under fluorescent lighting, tungsten lighting or outdoor light.

Digital cameras may include charge coupled device (CCD) sensors or complementary metal oxide semiconductor (CMOS) sensors. In either case it would be desirable to make color corrections to the captured image based on the current ambient light conditions. However, generally only estimated corrections are possible with existing digital cameras.

Thus, there is a continuing need for techniques for enabling digital cameras to make the type of color corrections made by the human eye.

SUMMARY

In accordance with one aspect of the present invention, a method of calibrating a digital camera for ambient light conditions includes measuring the ambient white light intensity. A plurality of lights, each of a different wavelength, are illuminated. The intensity of each of the lights, together with the ambient intensity, is measured. These measurements are then used to calibrate the digital camera for the ambient light conditions.

BRIEF DESCRIPTION OF THE DRAWINGS

FIG. 3 is a schematic, cross-sectional view of another embodiment of the present invention;

FIG. 4 is a schematic cross-sectional view corresponding to FIG. 3 but with a calibration device rotated out of the imaging axis;

FIG. 5 is a cross-sectional view taken generally along the line 5-5 in FIG. 4;

FIG. 6 is a cross-sectional view taken generally along the line 6-6 in FIG. 3;

DETAILED DESCRIPTION

Figure 1:
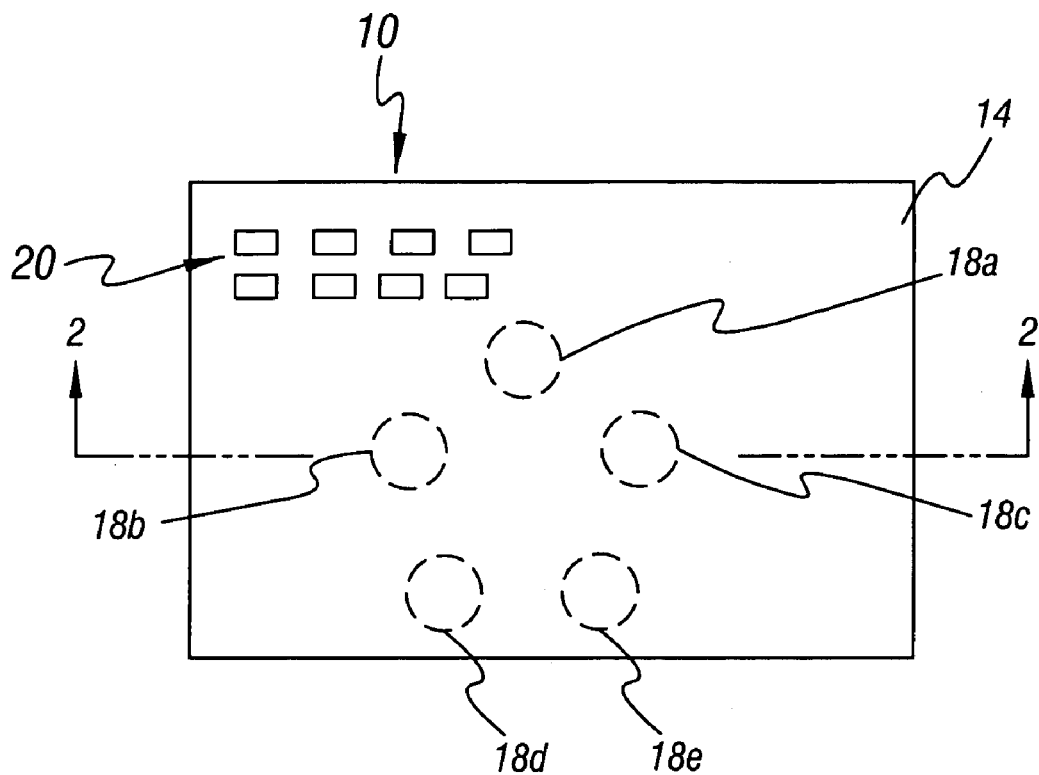
FIG. 1 is a top plan view of one embodiment of the present invention.
Figure 2:
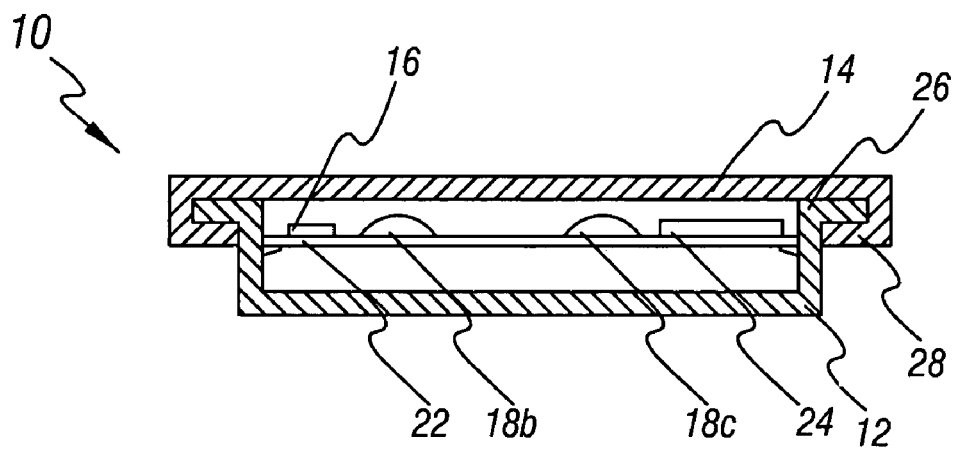
FIG. 2 is a cross-sectional view taken generally along the line 2-2 in FIG. 1.

Referring to FIGS. 1 and 2, a portable device 10 for calibrating a digital camera for ambient light conditions and unit-to-unit variations includes a cover 14 which slidingly engages a housing 12 in one embodiment of the invention. The cover 14 is made of substantially light translucent, white colored material such as plastic. Coated on the cover are indicia 20 which provide information about the optical characteristics of the particular cover. A plurality of light emitting elements 18 are mounted on a printed circuit board 22 together with a battery 24 and a sequential control circuit 16. The sequential control circuit 16 enables the light emitting elements 18a through 18e to be sequentially illuminated on command. The battery 24 provides the power source for the elements 18, which may be light emitting diodes of different wavelengths, and the sequential control circuit 16.

The cover 14 may include a slot defined by a flange 28 which engages the flange 26 on the housing 12 in one embodiment. In this way, the cover may be slidingly engaged over the housing 12.

Since the cover 14 is white, it reflects ambient light and can be imaged by a digital camera to obtain a white light intensity measurement. The particular optical characteristics of the cover 14 are encoded in the indicia 20 and may be recorded and analyzed by a digital camera. Under control of the sequential control circuit 16, the elements 18a through 18e may be caused to sequentially illuminate. Each of the elements produces light of a different wavelength which passes through the translucent cover 14 for detection by the digital camera. Generally, two of the elements 18 have wavelengths corresponding to one primary color, two of the elements 18 have wavelengths corresponding to a different primary color and one of the elements 18 has a wavelength corresponding to the third primary color. However, in some embodiments four elements 18 may be used and in other embodiments more than five elements 18 may be used.

In general, it is desirable to obtain a number of data points about the spectral responsivity of a particular camera under given ambient light conditions. Thus, it is desirable to have a light emitting element which emits light in each of the wavelengths of each of the primary colors plus at least one additional data point corresponding to one of the primary color wavelengths.

A digital camera may make a measurement of the ambient light conditions by imaging the cover 14 which reflects white light, taking into account the information represented by the indicia 20. Then each of the light emitting elements 18 may be sequentially illuminated, allowing the camera to take additional intensity measurements corresponding to each color. This information may be used to calibrate the camera for ambient light conditions.

Referring now to FIGS. 3 and 4, in another embodiment of the present invention, a device 10a is incorporated into a camera 30. The device 10a includes a white light transmissive plate 14a in the optical imaging axis A of the camera 30. The camera 30 includes optics 32 and an imaging sensor 34. Thus, in the configuration shown in FIG. 3, the white light transmissive element 14a, which may formed of plastic, passes white light indicative of ambient light conditions through the optics 32 to be recorded by the sensor 34.

A plurality of light emitting elements such as light emitting diodes 18b and 18c may be situated peripherally about the plate 14a so as to illuminate the edges of the plate 14a and thereby cause color to appear along the optical axis A of the camera 30. In addition, at various times, the plate 14a may be displaced out of the optical axis A as shown in FIG. 4 to allow normal image capture after calibration has been completed.

Referring to FIG. 5, the plate 14a may be effectively rotated out of position allowing the camera 30 to capture normal images. The plate 14a is rotatable around a hinge 36 in one embodiment of the invention. The camera may include five light emitting elements 18a through 18e, of different primary color wavelengths, positioned circumferentially about the plate 14a.

With the plate 14a rotated into position, as shown in FIG. 6, the elements 18a through 18e surround and illuminate the white light transmissive plate 14a. The plate 14a may include indicia 20a which provide information about the optical characteristics of the particular plate 14a to be used in the calibration process.

The device 10a operates in essentially the same manner as the device 10, shown in FIGS. 1 and 2. Namely, power is applied to the elements 18a through 18e to sequentially produce colors in the plate 14a. The camera 30 may take images without the color elements 18a through 18e illuminated by simply allowing light to pass through the plate 14a which is substantially translucent. Thereafter, the light emitting elements 18a through 18e are sequentially illuminated to get readings of the effects of ambient lighting conditions on the intensity of a plurality of colors of known spectral frequency.

The device 10a differs from the device 10 in that the device 10a completely controls the field of view of the camera. In contrast, the device 10 must be located, for example using pattern recognition software associated with the sensor 34. The pattern recognition software may locate the device by its shape and/or by the indicia 20 contained thereon. Once the camera identifies the device 10, it then can take the reflectivity measurements described previously.

The devices 10 and 10a also differ in that the device 10 works on white light reflection whereas the device 10a works on white light transmission. However, the principles are otherwise substantially similar.

Since the spectral frequency of the light emitting elements is known, one can measure the spectral response of the camera if one knows the intensity of the element 18 illumination. However, determining the intensity of the elements 18 requires yet another point of calibration. In some embodiments of the present invention it may be desirable to avoid this additional calibration.

In some embodiments it may be possible to avoid calibrating the intensity of the element 18 illumination. It has been determined that the digital camera sensors do not exhibit a substantial change in spectral characteristics. The overall shape and the color response curve is generally determined by the choice of material and this does not vary much with digital sensors. So long as the camera manufacturer meets the chemical purity specification, the thickness and concentration variations of the sensor may cause changes in the overall amplitude of the spectral responsivity. Due to Beer's Law, the shape of the spectral response curve varies in a predictable manner.

Figure 7:
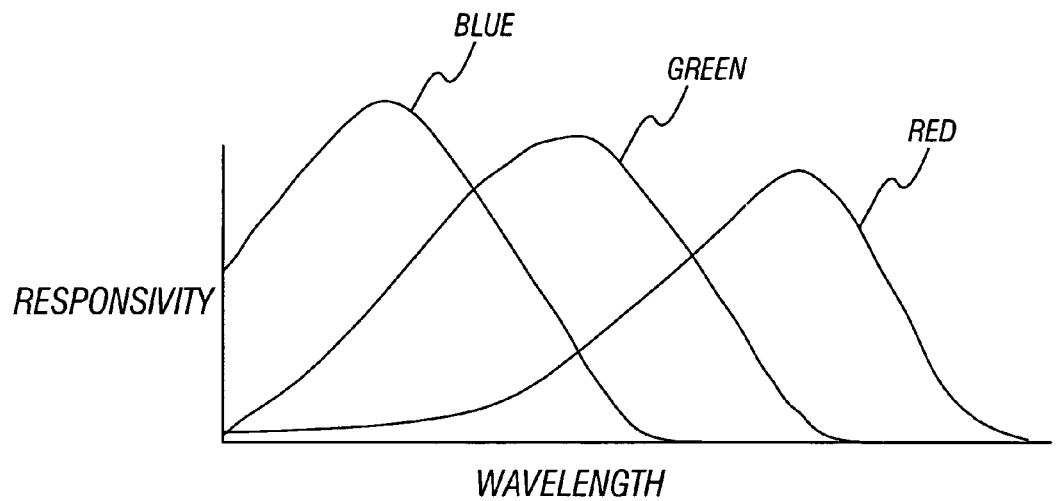
FIG. 7 is a hypothetical graph of spectral responsivity versus wavelength for a hypothetical image sensor.

Referring to FIG. 7, a hypothetical spectral response curve shows characteristic shapes for blue, green and red primary colors. Actual camera units may vary from unit to unit, showing a very slight movement of the center of each primary color curve, variation in the amplitude in the hump of the response, and the expected Beer's Law variation (as thickness varies the side lobes vary logarithmically).

Thus, there is a highly predictable variation of color sensitivity and the calibration routine need only determine the peak location in terms of wavelength and the overall amplitude of the peak for each primary color. There are known equations which describe these characteristics. By providing a sufficient number of colors in the form of elements 18, a simple simultaneous equation solution may be used to determine the intensity of the added illumination of the elements 18.

Figure 8:
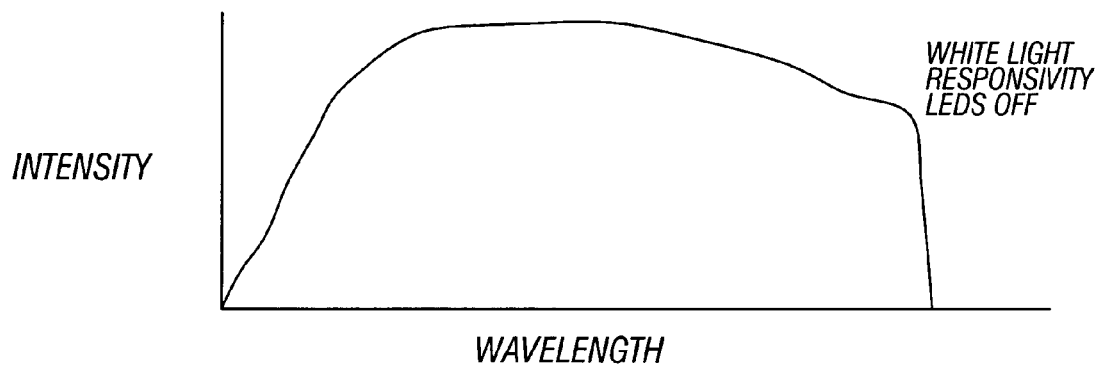
FIG. 8 is a hypothetical graph of intensity versus wavelength showing white light responsivity with the light emitting elements "off" in accordance with one embodiment of the present invention.
Figure 9:
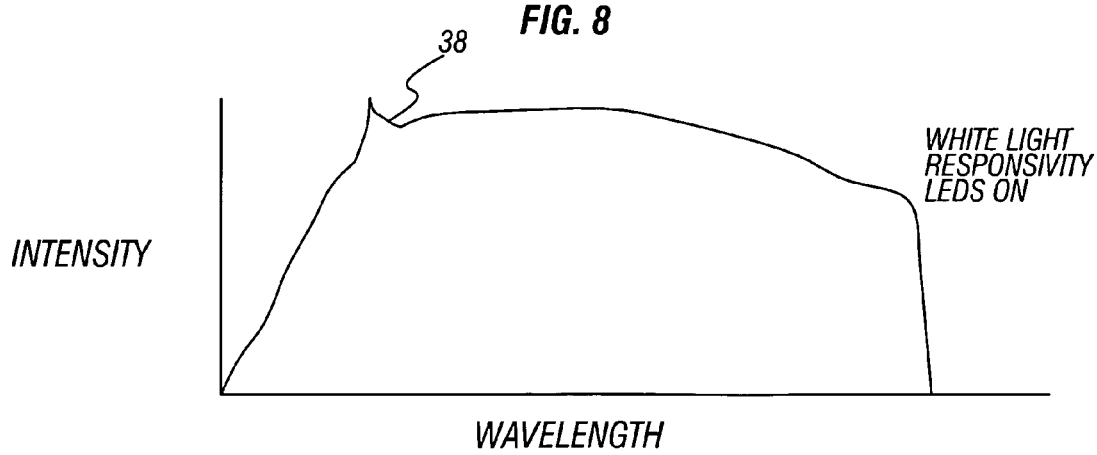
FIG. 9 is a hypothetical graph corresponding to FIG. 8 with one of the light emitting elements operated "on"

Referring to FIGS. 8 and 9, the calibration routine may be implemented whenever lighting conditions change. For example, if the nature of the indoor light changes or on changes from indoor to outdoor lighting, a recalibration process may be implemented. This process may be implemented automatically upon selection by the user or may be implemented automatically when different ambient lighting conditions are detected.

Initially, the camera takes an ambient light measurement without any of the elements 18 being operated. In the case of the embodiment of FIGS. 1 and 2, this is done by locating the device 10 and measuring the reflected white light off of the cover 14. In the case of the embodiment of FIGS. 3-6, with the plate 14a in the position shown in FIG. 3, white light transmissivity readings are taken.

Thereafter, the sequential control circuit 16 sequentially illuminates each of the elements 18a through 18e in either embodiment. The camera then makes measurements of the intensity of each color of known spectral frequency. Thus, referring to FIG. 8, a variety of points on the white light responsivity curve may be recorded initially. Thereafter, a spike 38 is measured with results from the illumination of each elements 18. That is, a measurement is taken at a specific wavelength corresponding to the wavelength of the illuminated element 18 plus a plurality of points on the curve of intensity versus wavelength may be taken which have the additive effect of the color added to the previous white light measurements.

Using known transfer functions, a computing device, for example, included in the camera, can compute what the intensity of the white light must have been. Knowing that intensity, the camera can determine what was the differential contribution of each element 18. By removing the contribution of each element 18, the camera can determine a plurality of points on the white light responsivity curve for the given ambient conditions. Using information about known ambient lighting conditions, a correction factor can be produced which allows the camera to correct for the differential effect of the new lighting conditions.

Figure 10:
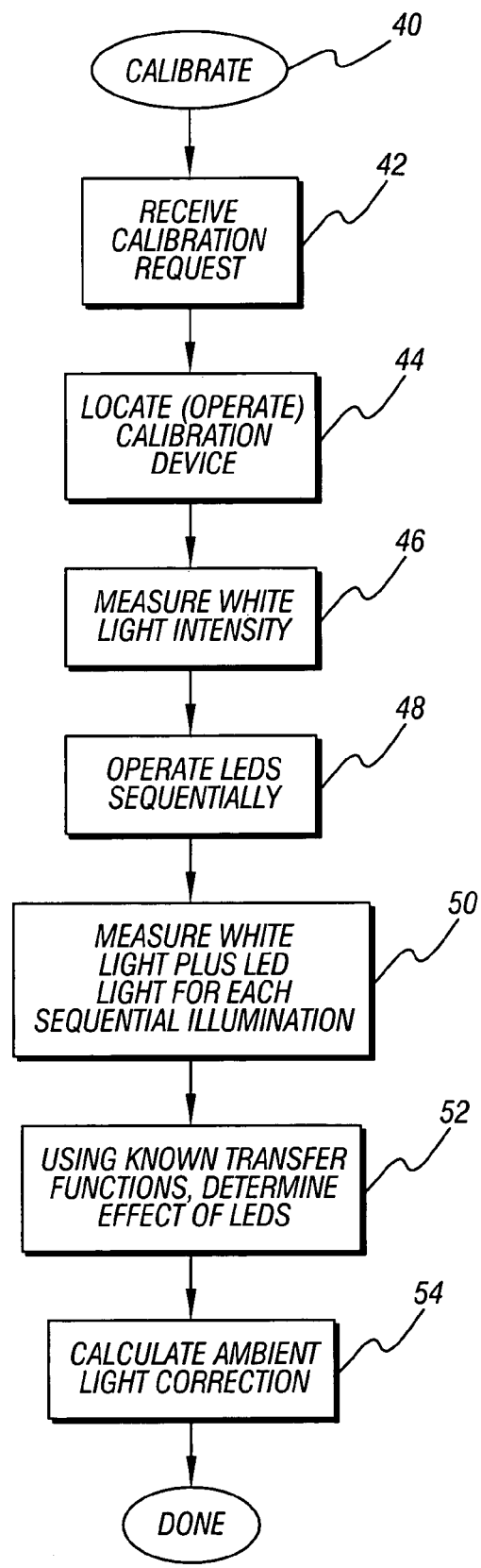
FIG. 10 is a flow chart for software for implementing one embodiment of the present invention.
Figure 11:
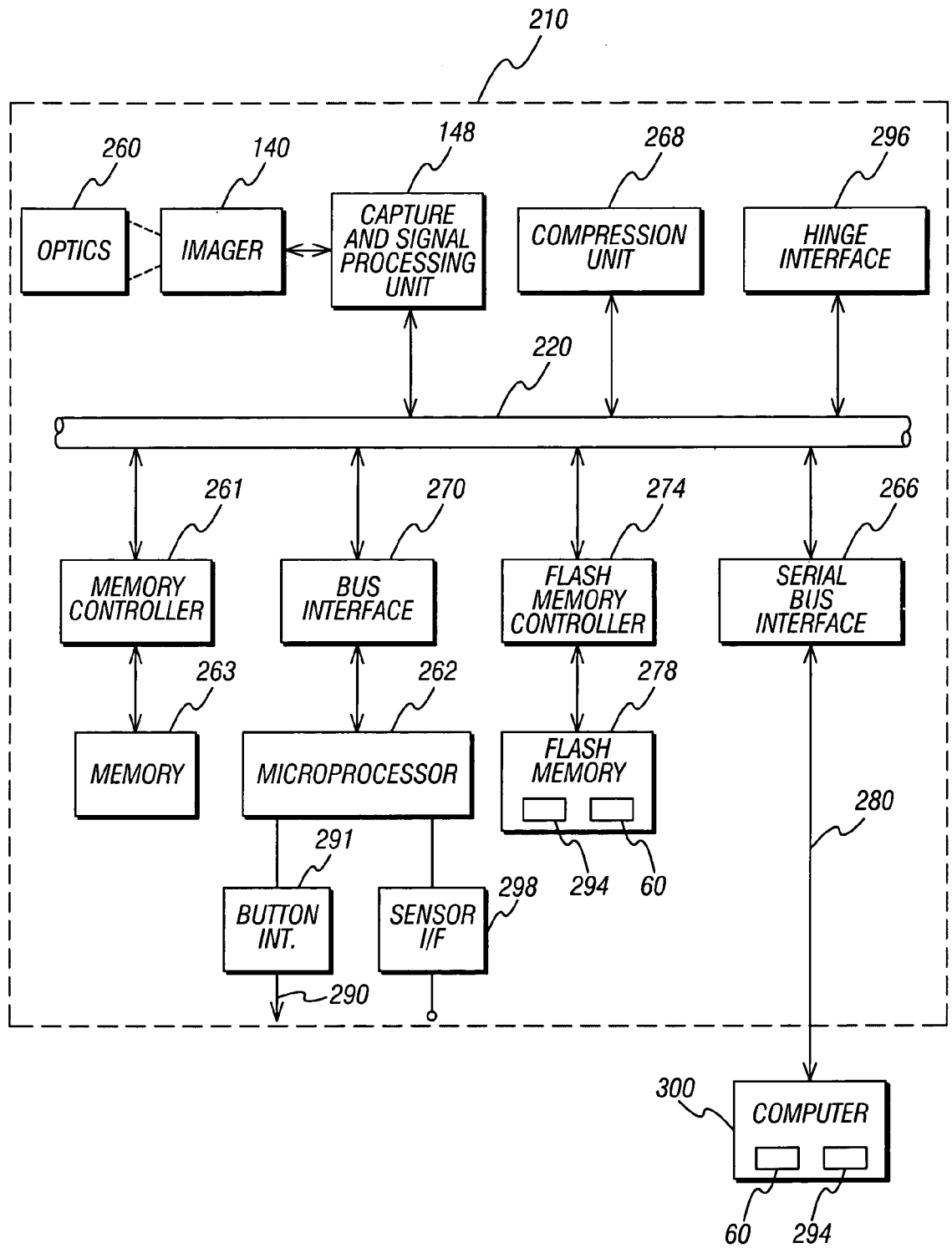
FIG. 11 is a block diagram of a camera in accordance with one embodiment of the present invention.

Referring now to FIGS. 10 and 11, software 40 stored in a memory 278, implements an automatic calibration routine in accordance with one embodiment of the present invention. When a calibration request is received, as indicated in block 42, the camera either locates the calibration device 10, for example using pattern recognition techniques, or operates the plate 14a into the position shown in FIG. 3 in embodiments which use an internal calibration device 10a (block 44).

The camera automatically measures the white light intensity (block 46) either as reflected off the device 10 or as transmitted through the device 10a. Thereafter, each of the light emitting elements 18 are operated sequentially as indicated in block 48. Additional measurements which record the white light plus the colored light produced by each element 18 are made for each sequential illumination (block 50).

Using known transfer functions, the effects of the illumination of the elements 18 are measured as indicated in block 52. Thereafter, the spectral responsivity of the new ambient lighting condition is determined and a correction factor is calculated (block 54).

Referring to FIG. 11, in some embodiments, the imager 140 may be part of a digital camera 210 that includes circuitry that interacts with the imager 140. Besides the imager 140, the camera 210 may include optics 260 to focus the optical image onto the focal plane of the imager 140. A capture and signal processing unit 148 may interact with the imager 140 to capture the pixel image and transfer a frame of data that indicates the pixel image to a random access memory (RAM) 263. To accomplish this, the capture and signal processing unit 148 may be coupled to a bus 220, along with a memory controller 261 that receives the frame from the bus 220 and generates signals to store the data in the memory 263.

The camera 210 may also include a compression unit 268 that may interact with the memory 263 to compress the size of the frame before storing the compressed frame in a flash memory 278. The compression unit 268 may be coupled to the bus 220, along with a flash memory controller 274 that receives the compressed frame from the bus 220 and generates signals to store the data in the flash memory 278. To transfer the compressed frame to a computer, the camera 210 may include a serial bus interface 266 that is coupled to the bus 220 to retrieve the compressed frame from either the memory 263 or the flash memory 278. The serial bus interface 266 generates signals on a serial bus 280 to transfer an indication of the compressed frame to a computer 300, for example.

Circuitry external to the imager 140 may send requests to the imager 140. For example, in some embodiments, the computer 300 may transmit a request to the camera 210 via the serial bus interface 266 to perform color calibration. A processor, or microprocessor 262 (a Pentium based microprocessor, an Advanced Risc Machine (ARM) microprocessor, an 80X86 processor or a microcontroller, as just a few examples), of the camera 210 may, for example, retrieve an indication of the request from the serial bus interface 266 and transmit an indication of the request to the imager 140.

In some embodiments, a request to calibrate the array 140 may come from circuitry of the camera 210, such as a switch or button 290 of the camera 210. As an example, the camera 210 may include a button interface 291 to indicate the status of the button 290 to the microprocessor 262. The microprocessor 262 may be coupled to the bus 220 through a bus interface 270.

In some embodiments, the request may be automatically generated. The computer 300 may receive an indication that lighting conditions have changed via a sensor coupled to the processor 262 via an interface 298. In this manner, the microprocessor 262 may automatically generate the request to calibrate the imager 140.

To enable a calibration to occur, in the embodiments of FIGS. 3-6, the hinge 36 may be operated to bring the plate 14a into the imaging axis A. This may be implemented by the microprocessor 262 through the hinge interface 296.

The flash memory may also store the pattern recognition software 294 for embodiments of the type shown in FIGS. 1 and 2. Alternatively, the software 294 and 60 may be stored on the host computer 300.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of calibrating a digital camera for ambient light conditions comprising:
   sequentially illuminating a plurality of lights arranged circumferentially about a white light transmissive plate, each of a different wavelength;
   measuring the intensity of each of said lights; and
   using said measurements to calibrate said digital camera for the ambient light conditions.

2. The method of claim 1 including measuring the ambient white light intensity.

3. The method of claim 2 wherein measuring the ambient white light intensity is implemented automatically in response to a request for calibration.

4. The method of claim 2 wherein measuring the ambient white light intensity is implemented automatically in response to the detection of a change in ambient light conditions.

5. The method of claim 2 wherein measuring the ambient light conditions includes imaging an external device.

6. The method of claim 5 further including using pattern recognition techniques to locate an external calibration device.

7. The method of claim 2 wherein measuring the ambient white light intensity involves measuring the light transmitted by a light emitting element coupled to said camera.

8. The method of claim 7 wherein measuring the ambient white light intensity includes moving a white light transmissive element into the optical axis of said digital camera.

9. The method of claim 2 further including measuring the white light reflected by an external device and identifying indicia on said external device containing information about the optical characteristics of said external device.

10. The method of claim 2 wherein measuring the ambient white light intensity includes measuring the light transmitted though a device coupled to said camera and capturing information recorded on said device about the optical characteristics of said device.

11. The method of claim 1 wherein illuminating a plurality of lights involves illuminating at least four lights of different wavelengths.

12. The method of claim 1 wherein illuminating a plurality of lights includes illuminating at least five lights of different wavelengths.

13. A computer readable medium for storing computer instructions that, when executed on a computer, enable a processor-based system to:
   sequentially illuminate a plurality of lights arranged circumferentially, each of a different wavelength;
   automatically measure the ambient white light intensity of each of said lights in response to a request for calibration;
   automatically cause measurements of the white light intensity to be taken in response to the detection of a change in ambient light conditions; and
   calibrate said digital camera for the ambient lighting conditions using said measurements.

14. The medium of claim 13 further storing instructions that cause a processor-based system to cause a measurements to be taken of the light transmitted by a light emitting element coupled to said camera.

15. The medium of claim 13 further storing instructions that cause a processor-based system to use pattern recognition techniques to locate an external calibration device.

16. The medium of claim 13 further storing instructions that cause a processor-based system to measure the white light reflected by an external device and identify indicia on said external device containing information about the optical characteristics of said external device.

17. The medium of claim 13 further storing instructions that cause a processor-based system to measure the light transmitted though a device coupled to said camera and capture information recorded on said device about the optical characteristics of said device.

18. A portable device for calibrating a digital camera for varying ambient light conditions comprising:
- a housing having a white surface, said housing including two slidably connecting housing portions, one of said portions including said white surface;
- a plurality of light emitting elements adapted to illuminate said white surface; and
- a control circuit adapted to sequentially illuminate said light emitting elements, the other of said housing portions including said control circuit, a battery and said light emitting elements.

19. The device of claim 18 including indicia on said white surface containing coded information about the optical characteristics of said white surface.

20. The device of claim 18 including five light emitting elements, each emitting light of a different wavelength, said elements coupled to said control circuit.

21. The device of claim 20 including two light emitting elements emitting light of different wavelengths corresponding to a first primary color, two light emitting elements emitting light of different wavelengths corresponding to a second primary color and at least one light emitting element emitting light of the wavelength of a third primary color.

22. A digital camera comprising:
- an imaging sensor having an optical axis;
- a white light transmissive plate mounted in said optical axis of said sensor and displaceable from said optical axis;
- a plurality of light emitting elements arranged circumferentially about said white light transmitting plate to illuminate said white light transmissive plate with a plurality of different wavelengths; and
- a control circuit to sequentially illuminate said light emitting elements.

23. The camera of claim 22 wherein said white light transmissive plate is rotatable out of the optical axis of said sensor.

24. The camera of claim 22 including two light emitting elements emitting light of different wavelengths corresponding to a first primary color, two light emitting elements emitting light of different wavelengths corresponding to a second primary color and at least one light emitting element emitting light of the wavelength of a third primary color.

25. The camera of claim 22 adapted to take a plurality of measurements and to correct color based on ambient light conditions.

26. The camera of claim 25 including a processor adapted to automatically correct color when a change in ambient light conditions is detected.

27. The camera of claim 25 including a processor adapted to automatically correct color when an input signal is received indicative of a calibration request.

* * * * *